UNITED STATES PATENT OFFICE.

HENRI TOBLER, OF HACKENSACK, NEW JERSEY, ASSIGNOR TO CITRO CHEMICAL COMPANY, OF MAYWOOD, NEW JERSEY, A CORPORATION OF NEW JERSEY.

MANUFACTURE OF ORGANIC ACIDS.

1,288,293.  Specification of Letters Patent.  Patented Dec. 17, 1918.

No Drawing.  Application filed November 9, 1917. Serial No. 201,041.

*To all whom it may concern:*

Be it known that I, HENRI TOBLER, a citizen of the United States, residing at Hackensack, in the county of Bergen, State of New Jersey, have invented certain new and useful Improvements in the Manufacture of Organic Acids; and I do hereby declare the following to be a full, clear, and exact description of the invention, such as will enable others skilled in the art to which it appertains to make and use the same.

This invention relates to the manufacture of organic acids, such as citric or tartaric acids, from the impure calcium salts of such acids; and it comprises a process of manufacture which results in the elimination of the impurities which are contained in such organic salts in considerable amount.

According to the present invention, impure calcium salts of the organic acids are treated with alkali metal bi-sulfate, such as sodium bi-sulfate or niter cake; and the calcium salt is thereby converted into the free acid and the sodium salt with accompanying formation of calcium sulfate.

The water insoluble calcium salts of organic acids, such as citric or tartaric acids, are generally soluble in a solution of the organic acid; and the solubility of such organic calcium salts in their corresponding acids is generally greater than the solubility of calcium sulfate under the same conditions. A saturated solution of the organic calcium salt in its own acid will precipitate calcium sulfate in the presence of an alkaline sulfate, with accompanying formation of the corresponding alkaline organic salt.

The above reaction will also take place when the water insoluble calcium salt of the organic acid is treated with an alkali metal bi-sulfate.

These reactions are made use of, according to the present invention, for the purification of the raw material and for the manufacture of organic acids of high purity therefrom.

The invention will be further described and illustrated in connection with the treatment of impure calcium citrate, with accompanying impurities, usually considerable in amount, the elimination of which is highly desirable.

Calcium citrate is brought into contact with a solution of sodium bi-sulfate or niter cake and the reaction promoted by thorough agitation or mixture. The reaction which takes place may be illustrated, for example, by the following equation:

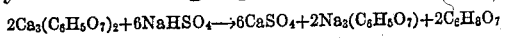

As the result of this reaction the citric acid is set free from the calcium citrate and is found in solution partly as free citric acid and partly as sodium citrate, while the insoluble calcium sulfate is formed. The impurities of the original impure citrate are present partly in solution and partly in an insoluble form; that is, the insoluble impurities are mixed with the insoluble calcium sulfate and the soluble impurities are in solution with the citric acid and sodium citrate.

In some cases it is important to eliminate both the soluble and insoluble impurities; while in other cases the soluble impurities alone need to be removed; before proceeding with the further treatment or use of the material. Accordingly, the product of the above reaction may be treated, for example, to eliminate the soluble impurities, or to eliminate both the soluble and insoluble impurities, before the final treatment of the material.

Where the soluble impurities are to be removed and the insoluble impurities are to remain in the citrate, the following procedure may, for example, be followed:

A mixture of gypsum, sodium citrate and citric acid, produced as above described, is heated to boiling, and enough lime or calcium carbonate is added to neutralize the free acidity, with the result that the free citric acid is converted into calcium citrate. At the same time, the sodium citrate reacts with part of the calcium sulfate to form calcium citrate and sodium sulfate. There is thus precipitated all of the citric acid in the form of the calcium citrate, containing the insoluble impurities. By washing this precipitate all the soluble impurities will be eliminated and the insoluble impurities will likewise have been subjected to the boiling and washing operations.

The reaction which takes place may be illustrated, for example, by the following equation:

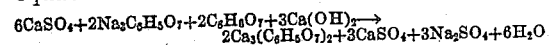

From the calcium citrate thus obtained, a solution of citric acid can be produced by treatment with sulfuric acid, calcium sulfate being at the same time formed. Inasmuch as the soluble impurities have been eliminated, the citric acid set free will be substantially free from such impurities. The citric acid can be obtained from its solution by concentration and repeated crystallization.

Where it is desired to eliminate both the soluble and insoluble impurities, the following procedure, for example, may be followed:

The mixture of gypsum, sodium citrate and citric acid, produced as above described, is filtered, and the calcium sulfate and insoluble impurities thereby removed. The liquid containing the sodium citrate and citric acid, together with the soluble impurities, is heated to boiling and neutralized by the addition of lime or calcium carbonate, in the manner above described; while pure calcium sulfate is added to cause precipitation of the sodium citrate, the reaction taking place in a manner similar to that illustrated in the above equation. The calcium sulfate may be obtained in the subsequent decomposition of the pure calcium citrate, for example, with sulfuric acid.

From the calcium citrate thus obtained, and which has been freed from both the soluble and insoluble impurities, citric acid of high purity can be produced by treatment, for example, with sulfuric acid, with resulting formation of calcium sulfate or gypsum which is available for use in the precipitation of sodium citrate, in the manner above described.

In carrying out the process of the present invention, as applied to the treatment of citrate of lime or calcium citrate, the following procedure is recommended:

A solution of sodium bisulfate in wash water is made containing about 100 grams per liter of sodium bisulfate. This solution is introduced into a wooden tank equipped with an agitator and an amount of citrate of lime or calcium citrate corresponding to the bisulfate in solution is added in a finely divided state. The reaction will be complete at the temperature of the room after about four hours with proper agitation. After the completion of the reaction the mixture is injected into a filter press equipped with a washing arrangement. The first liquid, weighing about 12° Baumé, is collected with the first washing in a wooden tank, steam injected, and the liquid heated to boiling. The steam is then shut off and enough milk of lime or calcium carbonate added to neutralize the acid and the proper amount of calcium sulfate is also added to complete the reaction. The whole mixture is then boiled again for about one quarter of an hour and then filtered and the citrate washed with boiling water. The citrate is then ready for treatment, for example, with sulfuric acid, for the production of citric acid in a high state of purity. The calcium sulfate and the insoluble impurities are in the filter press and are washed until all the citric acid is extracted.

It will accordingly be seen that the process of the present invention is a combined process of purification and production of citric acid from impure calcium citrate in a simple and economical manner.

I claim:—

1. The method of removing impurities from impure calcium salts of organic acids and of producing the organic acids therefrom, which comprises treating such impure salts with an alkali metal bi-sulfate to set free the organic acid in a soluble form, heating the resulting solution in admixture with calcium sulfate, and adding sufficient lime to neutralize the free acidity, thereby precipitating the organic acid in the form of its calcium salt, removing the solution containing the soluble impurities from the calcium salt, and treating the calcium salt to set free the organic acid therefrom; substantially as described.

2. The method or removing impurities from impure calcium salts of organic acids and of producing the organic acids therefrom, which comprises treating such impure salts with an alkali metal bi-sulfate to set free the organic acid in a soluble form, with accompanying formation of calcium sulfate, heating the resulting mixture containing the calcium sulfate and adding sufficient lime to neutralize the free acidity, thereby precipitating the organic acid in the form of its calcium salt, removing the solution containing the soluble impurities from the calcium salt, and treating the calcium salt to set free the organic acid therefrom; substantially as described.

3. The method of removing impurities from impure calcium citrate and of producing citric acid therefrom, which comprises treating the impure calcium citrate with alkali metal bi-sulfate to set free the citric acid in a soluble form, heating the resulting solution in admixture with calcium sulfate and adding sufficient lime to neutralize the free acidity, thereby precipitating the citric acid in the form of its calcium salt, removing the solution containing the soluble impurities from the calcium salt, and treating the calcium salt to set free the organic acid therefrom; substantially as described.

4. The method of removing impurities from impure calcium citrate and of producing citric acid therefrom, which comprises treating the impure calcium citrate with an alkali metal bi-sulfate to set free the citric acid in a soluble form, with accompanying formation of calcium sulfate, heating the resulting mixture containing the calcium sulfate and adding sufficient lime to neutralize the free acidity, thereby precipitating the citric acid in the form of its calcium salt, removing the solution containing the soluble impurities from the calcium salt, and treating the calcium citrate to set free the citric acid therefrom; substantially as described.

5. The method of removing impurities from impure calcium salts of organic acids, and of producing the organic acids therefrom, which comprises treating such impure salts with an alkali metal bi-sulfate to set free the organic acid in a soluble form, with accompanying formation of calcium sulfate, separating the solution from the calcium sulfate and insoluble impurities, heating the solution in admixture with calcium sulfate and adding sufficient lime to neutralize the free acidity, thereby precipitating the organic acid in the form of its calcium salt, removing the solution containing the soluble impurities from the calcium salt, and treating the calcium salt to set free the organic acid therefrom; substantially as described.

6. The method of removing impurities from impure calcium citrate and of producing citric acid therefrom, which comprises treating the impure calcium citrate with an alkali metal bi-sulfate to set free the citric acid in a soluble form, with accompanying formation of calcium sulfate, separating the calcium sulfate from the solution, heating the solution in admixture with sufficient lime to neutralize the free acidity and with sufficient calcium sulfate to complete the reaction, thereby precipitating the citric acid in the form of its calcium salt, removing the solution containing the soluble impurities from the calcium salt, and treating the calcium citrate to set free the citric acid therefrom, substantially as described.

In testimony whereof I affix my signature.

HENRI TOBLER.